United States Patent [19]

Petrovich et al.

[11] Patent Number: 5,351,541
[45] Date of Patent: Oct. 4, 1994

[54] MICROWAVE RESONATOR ACCELEROMETER

[75] Inventors: Anthony Petrovich, Tewksbury; Marc Weinberg, Needham, both of Mass.

[73] Assignee: Charles Stark Draper Laboratories, Cambridge, Mass.

[21] Appl. No.: 823,866

[22] Filed: Jan. 22, 1992

[51] Int. Cl.$^5$ .............................................. G01P 15/08
[52] U.S. Cl. ..................... 73/517 R; 73/517 AV; 324/635; 324/636
[58] Field of Search ......... 73/517 R, 517 AV, 517 A, 73/517 B; 324/635, 636

[56] References Cited

U.S. PATENT DOCUMENTS

| | | | |
|---|---|---|---|
| 2,520,604 | 8/1950 | Linder | 324/636 |
| 3,636,752 | 1/1972 | Ishii | 73/517 R |
| 4,891,982 | 1/1990 | Norling | 73/517 AV |

*Primary Examiner*—Hezron E. Williams
*Assistant Examiner*—Helen C. Kwok
*Attorney, Agent, or Firm*—Joseph S. Iandiorio; Kirk Teska

[57] ABSTRACT

A microwave resonator accelerometer including a microwave resonant cavity having a predetermined resonant frequency; the cavity including a flexible portion; a proof mass fixed to the flexible portion for changing the geometry and establishing a new resonant frequency of the cavity in response to an acceleration force on the proof mass; a microwave frequency signal at or approximately at the predetermined resonant frequency coupled to the cavity; and a discrimination circuit, responsive to the reflected microwave signal from the cavity, for discriminating a shift in the predetermined resonant frequency of the cavity to a new resonant frequency effected by the change in geometry of the cavity resulting from the acceleration force on the proof mass.

19 Claims, 6 Drawing Sheets

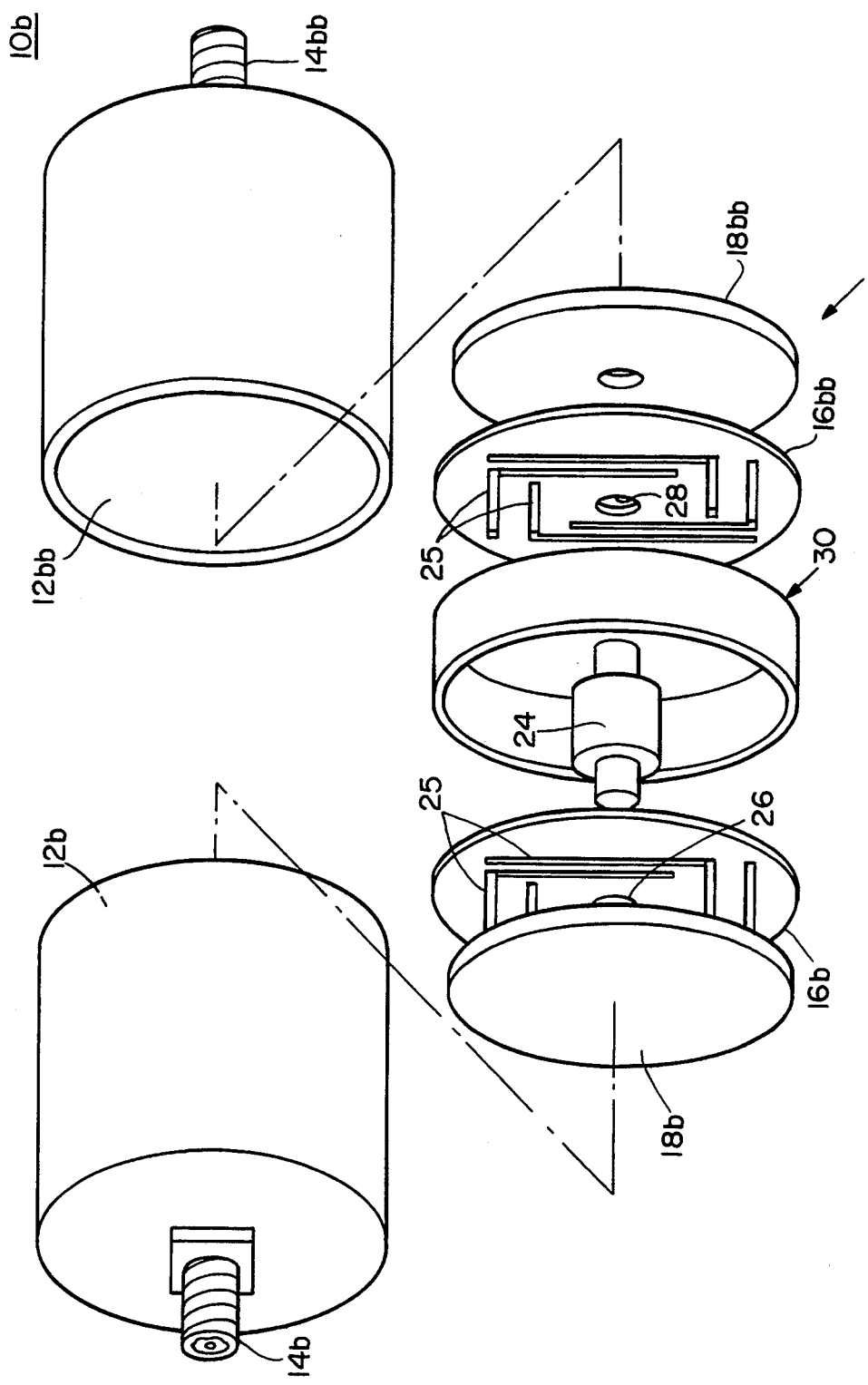

MICROWAVE RESONATOR ACCELEROMETER

FIELD OF INVENTION

This invention relates to a microwave resonant accelerometer, and more particularly to such an accelerometer which senses acceleration as a function of the change in geometry of a resonant microwave cavity.

BACKGROUND OF INVENTION

The highest performance accelerometers presently in use are based on a pendulous gyro mechanism. They have the high performance required even for strategic missile applications. Another technology with the potential for performance at such levels is the quartz resonant beam accelerometer. The gyroscopically rebalanced pendulous gyro has several precision moving parts and is therefore an inherently complex and expensive device. The quartz resonant beam accelerometer, on the other hand, is a simpler and less expensive device but to date has fallen an order of magnitude short of the performance required by strategic missiles.

SUMMARY OF INVENTION

It is therefore an object of this invention to provide an improved accelerometer which is simpler, more rugged, yet extremely accurate and reliable.

It is a further object of this invention to provide such an improved accelerometer which affords a wider selection of materials.

It is a further object of this invention to provide such an improved accelerometer which is significantly less expensive.

It is a further object of this invention to provide such an improved accelerometer which virtually eliminates hysteresis and attendant error, and produces a more linear acceleration signal.

It is a further object of this invention to provide such an improved accelerometer which renders acceleration in terms of frequency which is directly compatible with digital signal processing without analog to digital conversion.

The invention results from the realization that a truly accurate yet simple accelerometer can be achieved by sensing the shift in resonance at microwave frequencies of a cavity whose geometry is modified by the action of a proof mass subject to acceleration forces.

This invention features a microwave resonator accelerometer including a microwave resonant cavity having a predetermined resonant frequency. The cavity includes a flexible portion. There is a a proof mass fixed to the flexible portion for changing the geometry and establishing a new resonant frequency of the cavity in response to an acceleration force on the proof mass. There are means for coupling to the cavity a microwave frequency signal at or approximately at the predetermined resonant frequency. There are means, responsive to the reflected microwave signal from the cavity, for discriminating a shift in the predetermined resonant frequency of the cavity to a new resonant frequency effected by the change in geometry of the cavity resulting from the acceleration force on the proof mass.

In a preferred embodiment the flexible portion is made of a ceramic material. The cavity may include a microwave reflector fixed to the proof mass and disposed inside the flexible portion. There may be means responsive to the means for discriminating to enable the means for coupling to shift the resonant frequency of the microwave signal to the new resonant frequency. There may be means responsive to the means for enabling for detecting the difference between the predetermined resonant frequency and the new resonant frequency representative of the acceleration of the proof mass. The cavity may be formed of a low or zero temperature coefficient of expansion material. The means for discriminating may include a phase locked loop circuit. The phase locked loop circuit may include an oscillator for generating a microwave carrier signal at or approximately at the predetermined resonant frequency. There are means for modulating the microwave carrier signal with a modulating signal, means for submitting the modulated microwave carrier signal to the means for coupling, and for receiving a reflected signal from the cavity. The phase locked loop also may contain means for determining an acceleration signal from the difference between the submitted modulated microwave signal and the reflected signal. The accelerometer may also include means responsive to the acceleration signal for adjusting the frequency of the microwave carrier signal to match the new resonant frequency of the cavity. The accelerometer may further include a converter circuit for converting the modulated microwave carrier signal from the microwave range to a lower range for signal processing.

In a preferred embodiment the microwave resonant accelerometer may include first and second complementary microwave resonant cavities each having a predetermined resonant frequency, each cavity including a flexible portion. The proof mass means is fixed to the flexible portion of each cavity for differentially changing the geometry and establishing a new resonant frequency of each cavity in response to an acceleration force on the proof mass. There may be means for coupling to each cavity a microwave frequency signal at or approximately at the predetermined resonant frequency and means, responsive to the reflected microwave signal from the cavity, for discriminating a shift in the predetermined resonant frequency of that cavity to a new resonant frequency affected by the change in geometry of the cavity resulting from the acceleration force on the proof mass means. The predetermined resonant frequency may be the same for each cavity or they may be different.

BRIEF DESCRIPTION OF DRAWINGS

Other objects, features and advantages will occur to those skilled in the art from the following description of a preferred embodiment and the accompanying drawings, in which:

FIG. 3 is an exploded three-dimensional view of a two-stage differential microwave resonator accelerometer according to this invention;

DESCRIPTION OF INVENTION

Figure 1:
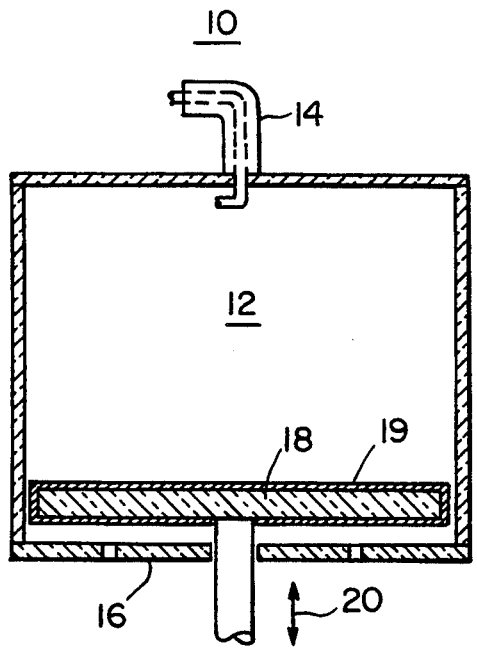
FIG. 1 is a schematic plan view of a single-stage microwave resonator accelerometer according to this invention using a ceramic flexure.

There is shown in FIG. 1 a single-stage microwave resonator accelerometer 10 including a cavity 12 with a coaxial coupler 14 for coupling into cavity 12 microwave energy, typically in the gigahertz range. At the other end, cavity 12 includes a ceramic flexure plate 16 which carries a proof mass 18. Proof mass 18 has a metal surface 19 provided to act as a reflecting surface for the microwave energy since ceramic flexure plate 16 does not have reflective properties. For this reason, proof mass 18 is located inside of cavity 12. The ceramic flexure plate 16 may be made of any of a variety of ceramics such as sapphire, quartz, glasses such as silica or modified silica, other crystal and ceramic materials, glass ceramic, e.g. partially crystallized glasses. The cavity could be made of a low-expansion coefficient material such as Invar, titania modified silica, or partially recrystallized lithium-aluminate silicate glass, for example.

In operation, a microwave signal, for example in the range of 10 GHz, is coupled to cavity 12 through coupling 14. The resonant frequency of cavity 12 is also 10 GHz. An acceleration force in either direction, as indicated by arrow 20, causes the movement of proof mass 18 that moves ceramic flexure plate 16 and thereupon changes the geometry of chamber 12. This change in the geometry of chamber 12 changes its resonant frequency to somewhat above or below the 10 GHz point. The reflected resonant signal is coupled back out of cavity 12 through coupling 14. The difference between the submitted microwave signal and the reflected microwave signal is used to determine the acceleration force applied to proof mass 18 as is explained hereinafter.

Figure 2:
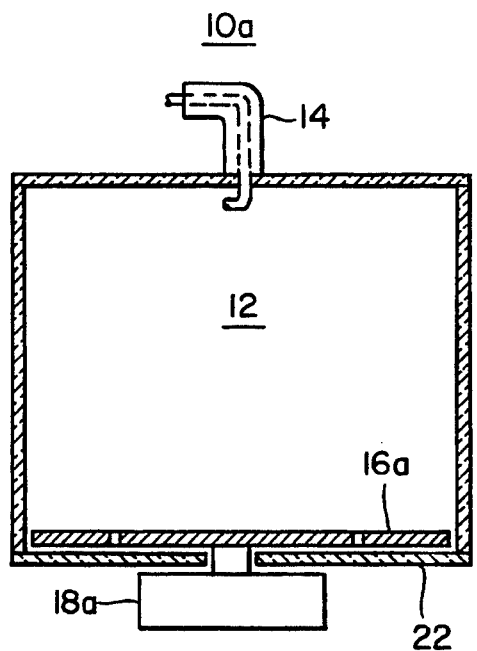
FIG. 2 is a view similar to FIG. 1 of a single-stage microwave resonator accelerometer according to this invention employing a metallic reflector.

Alternatively, microwave resonator accelerometer 10a, FIG. 2, may include a metal flexure plate 16a, in which case the proof mass 18a may be located either within or outside of cavity 12 since it no longer doubles as a reflective surface as it did when flexure plate 16 was made of a ceramic material. With a metal flexure plate 16a, no additional material is needed to preserve the "Q" of the chamber and reflect the necessary energy back to coupler 14. However, in this case if the flexure plate 16a is slotted or ported in some way to increase its flexibility, a second backing plate 22 may be used to confine the electromagnetic energy.

Figure 4:
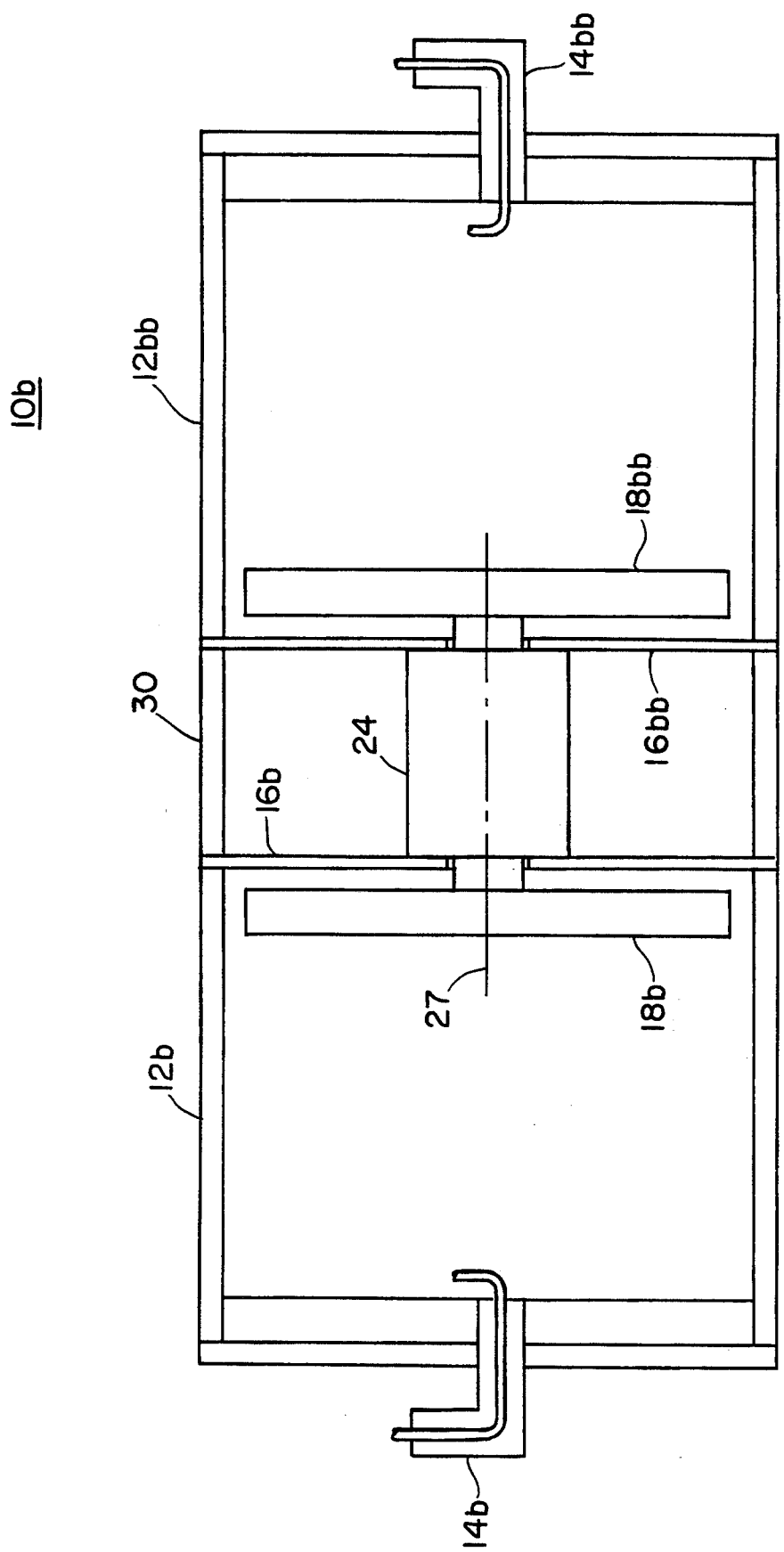
FIG. 4 is a schematic cross-sectional view of the differential accelerometer of FIG. 3.

In a more practical implementation, microwave resonator accelerometer 10b, FIG. 3, is constructed as a dual-stage differential accelerometer. There are two cavities 12b, 12bb, each of which includes a coaxial coupler 14b, 14bb. There are two ceramic flexure plates 16b, 16bb, each associated with its own proof mass plate 18b, 18bb which are fixed together by connector 24, which also forms a part of the effective proof mass. Clearance holes 26 and 28 in flexures 16b and 16bb respectively, permit them to flex without interference with connector 24. The flexure assembly 29 is completed by the flexure body ring 30. The flexure assembly 29 of accelerometer 10b can be more readily understood from the side elevational view in FIG. 4, where it can be seen that the flexure body ring 30 is equal in radius to cavities 12b and 12bb which abut on either side of it to form a closed structure.

Figure 5:
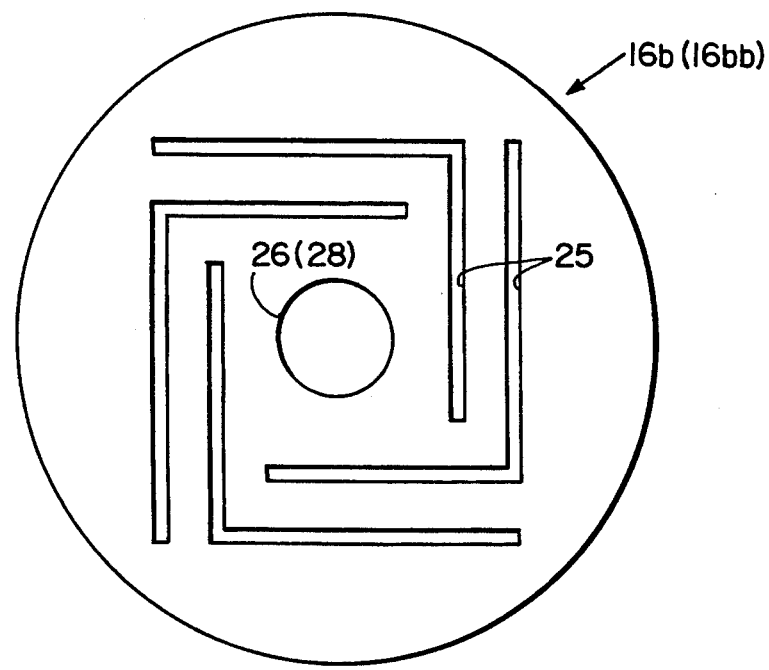
FIG. 5 is a plan view of one of the ceramic flexure plates shown in FIG. 3.

Flexure plates 16b and 16bb are circular in cross-section, as is the entire accelerometer, and include a plurality of cutouts or slots 25, FIG. 5, which increase their compliance along the axial direction as indicated by axis 27.

Figure 6:
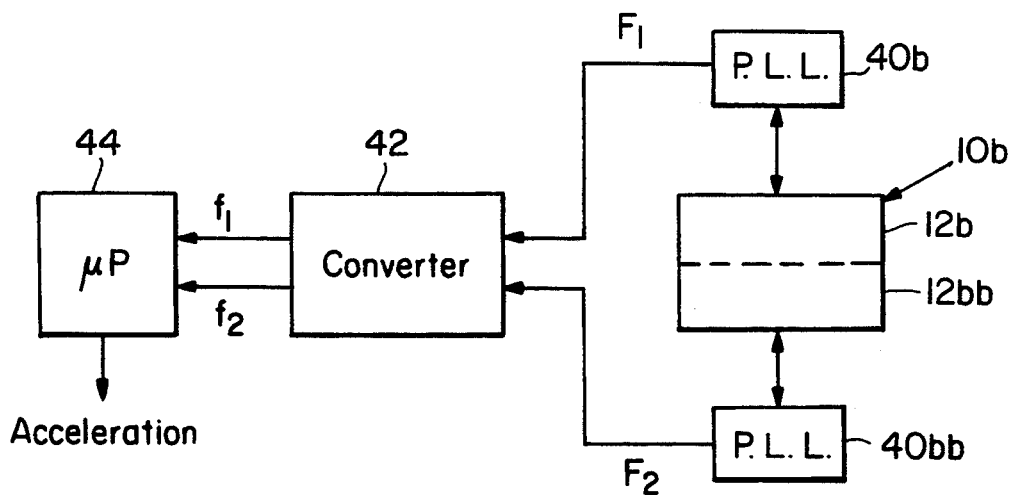
FIG. 6 is a block diagram of a complete two-stage differential microwave resonator accelerometer system including signal processing circuits.

In a dual-cavity differential microwave resonator accelerometer 10b as shown in FIG. 3, each cavity 12b, 12bb has associated with it a phase locked loop circuit 40b, 40bb, FIG. 6. When an acceleration force is sensed by proof mass 18b, 18bb the geometry of the two cavities is complementarily affected: one has its resonant frequency increased, the other decreased. As a result, phase locked loop circuits 40b and 40bb put out two different frequencies $F_1$ and $F_2$, in their reflective signals, one of which is higher and one of which is lower than the original resonant frequency of the cavities which were initially, nominally, tuned to the same resonant frequency. These microwave frequencies $F_1$, $F_2$ in the gigahertz range are converted in converter 42 to lower frequencies, typically in the megahertz range, $f_1$, $f_2$, more suitable for direct compatible processing in a digital microprocessor 44.

Figure 7:
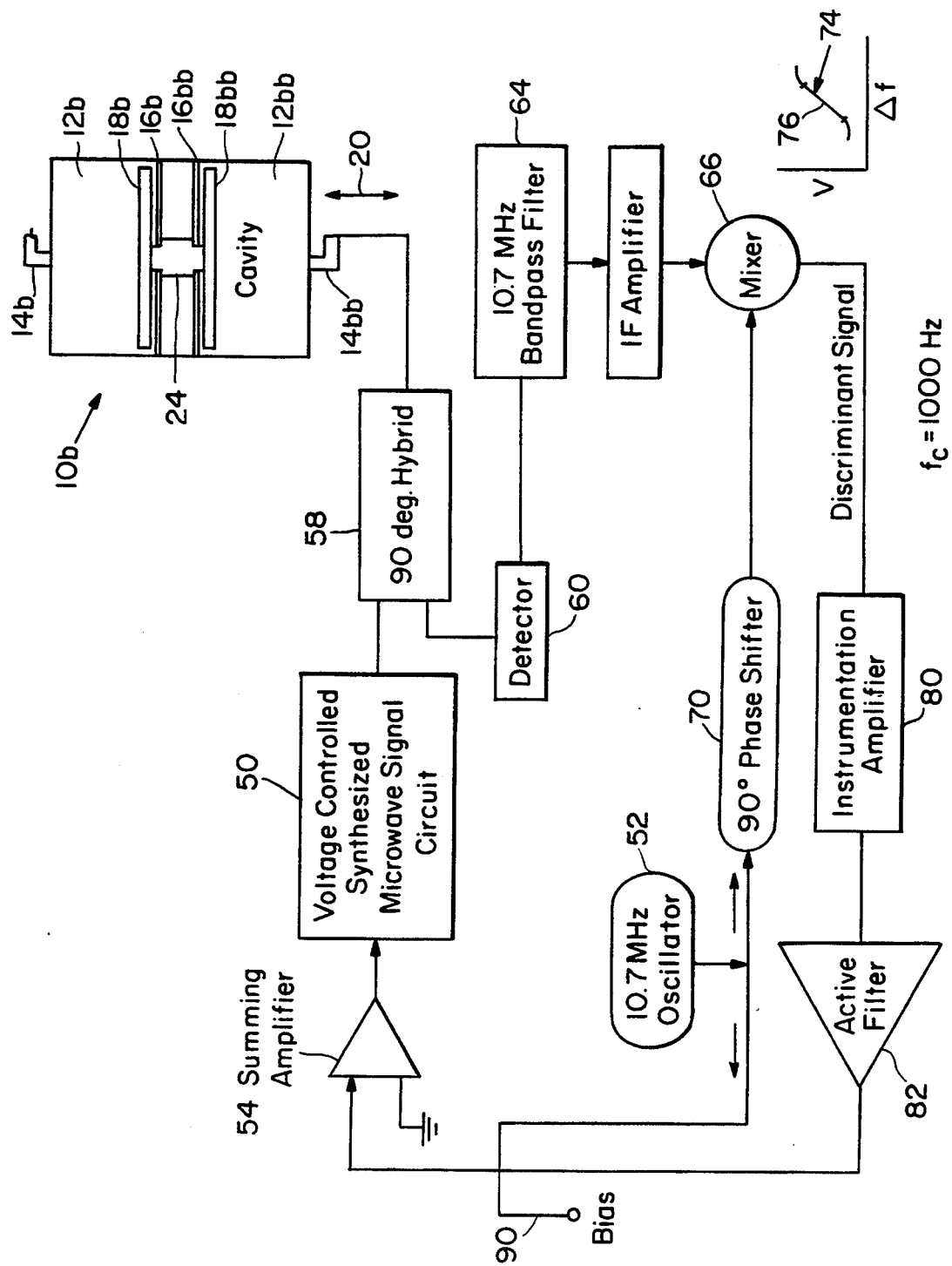
FIG. 7 is a more detailed schematic block diagram of a portion of the system of FIG. 6 associated with one of the stages.
Figure 8:
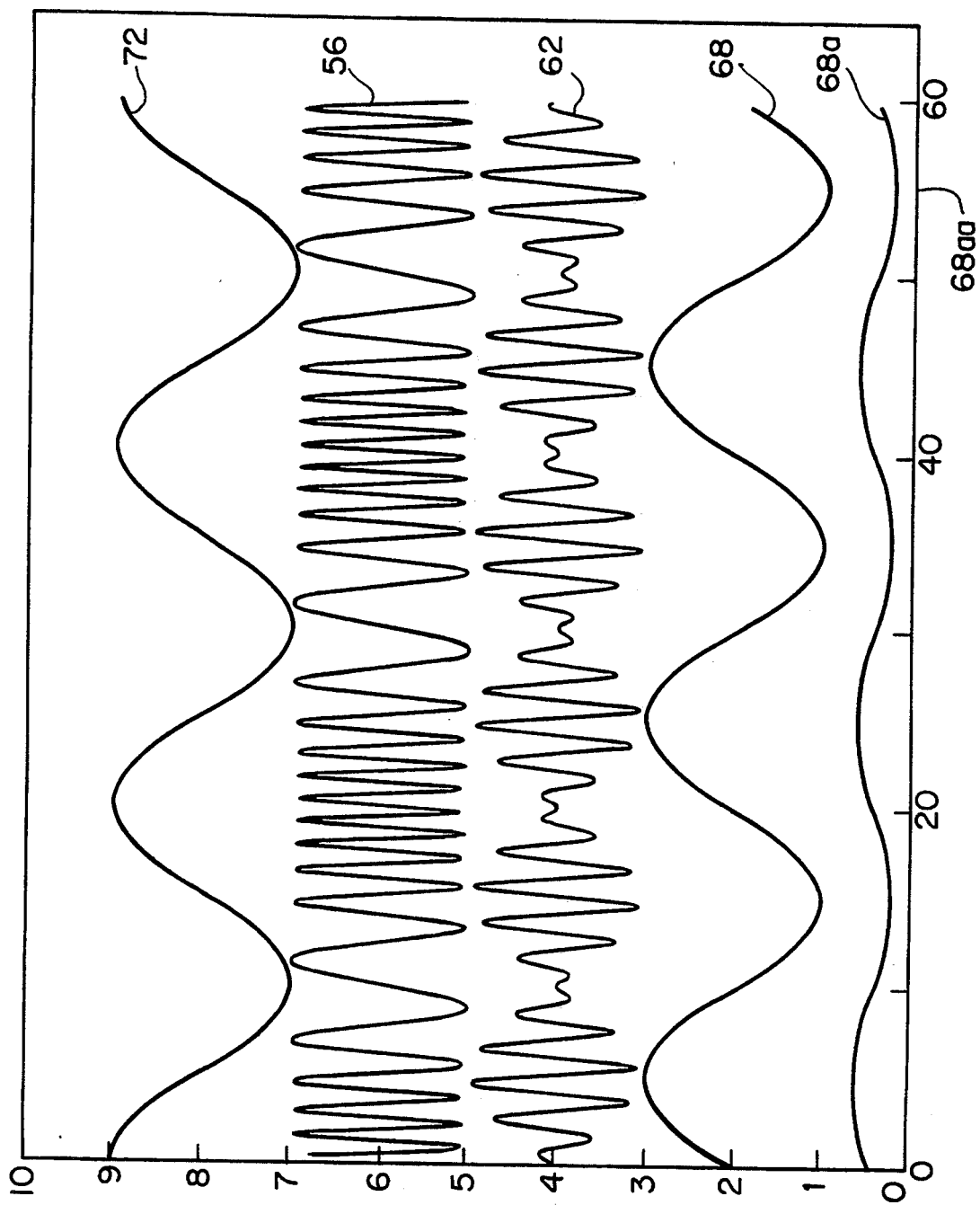
FIG. 8 illustrates a number of the waveforms that are present in the circuit of FIG. 7.

The difference $\Delta f$ in the two frequencies $f_1$, $f_2$ is calibrated in microprocessor 44 to produce a direct reading of acceleration. Phase locked loop circuits 40b, 40bb may be implemented as indicated with respect to circuit 40bb, shown in greater detail in FIG. 7. Voltage controlled synthesized microwave signal circuit 50 produces a 10 GHz signal modulated at 10.7 MHz by a signal from oscillator 52 delivered through summing amplifier 54. This signal, represented by the waveform 56 in FIG. 8, is delivered through 90° hybrid circuit 58 to coupler 14bb of cavity 12bb. The microwave energy is introduced and reflected in cavity 12bb, from whence it is returned to hybrid circuit 58 and directed to detector 60. The return wave or reflected wave delivered by hybrid circuit 58 to detector 60 is illustrated as waveform 62, FIG. 8. Bandpass filter 64 blocks frequencies other than 10.7 MHz which are submitted to mixer 66. The intermediate frequency (IF) amplifier 65 amplifies the 10.7 HH$_Z$ sinusoidal signal passing through 10.7 MHz band pass filter 64 and renders the amplified signal to mixer 66. IF amplifier 65 increases the amplitude of the signal from detector 60 and 10.7 MH$_Z$ band pass filter 64 to a level that provides optimal response in the mixer 66 i.e. provides a maximum discriminant signal for the frequency control loop. Detector 60 detects the envelope of signal 62, which envelope appears as waveform 68 in FIG. 8. Also supplied to mixer 66 is the same 10.7 MHz signal from oscillator 52 which is used to modulate the 10 GHz carrier signal in circuit 50. However, in this case the 10.7 MHz signal from oscillator 52 is shifted 90° by phase shifter 70. The output of phase shifter 70 appears as waveform 72 in FIG. 8. The multiplication of the two signals in mixer 66 results in a discriminator signal which appears as indicated at waveform 74, FIG. 7, that shows the variation in voltage V with change in frequency f. By operating on the linear portion 76 of this curve, the DC output of mixer 66 can be amplified in amplifier 80, filtered by filter 82 and fed back to summing amplifier 54 to adjust the voltage input, thus the frequency output, from circuit 50.

Thus in operation, as an acceleration force 20 is applied to proof mass 18bb, the geometry of cavity 12bb is changed. This changes the resonant frequency, which makes the reflected wave to detector 60 differ from the input signal from circuit 50. This difference directly represents the acceleration force applied to the proof mass. However, by monitoring the change in frequency of circuit 50 demanded by summing amplifier 54 through the feedback from mixer 66, a frequency varying signal representative of the acceleration can be easily obtained. This frequency varying signal representative of the acceleration is directly compatible with subsequent digital signal processing after it has been stepped down from the microwave GHz range to the more common MHz signal processing range as is accomplished by converter 42, FIG. 6. The bias input 90 to summing amplifier 54 is used to adjust the output frequency from circuit 50, typically in the range of 10 GHz in order to match the resonant frequency of cavity 12bb.

Waveform 68 corresponds to a moderate accelerating force. For a lower accelerating force the detector output will appear as at 68a, and for no accelerating force it appears as a straight flat line coincident with the abscissa indicated at 68aa. Thus as a result of the 90° phase shift introduced by phase shifter 70, the system exhibits a maximum sensitivity: that is, when there is no acceleration force there is a zero differential signal provided, but, any, even slight, acceleration force begins to provide a signal as indicated at 68a, which could reach the magnitude of waveform 68 or beyond.

Typically, it is not practical to have both cavities set to the same resonant frequency, and therefore the system is operated with an offset between those two resonant frequencies. This is accommodated by simply setting the zero G acceleration force at some finite level above zero, then frequency differentials below that level indicate an acceleration in the negative direction while those above it indicate acceleration in the positive direction, or vice versa: the nomenclature is arbitrary.

Figure 9:
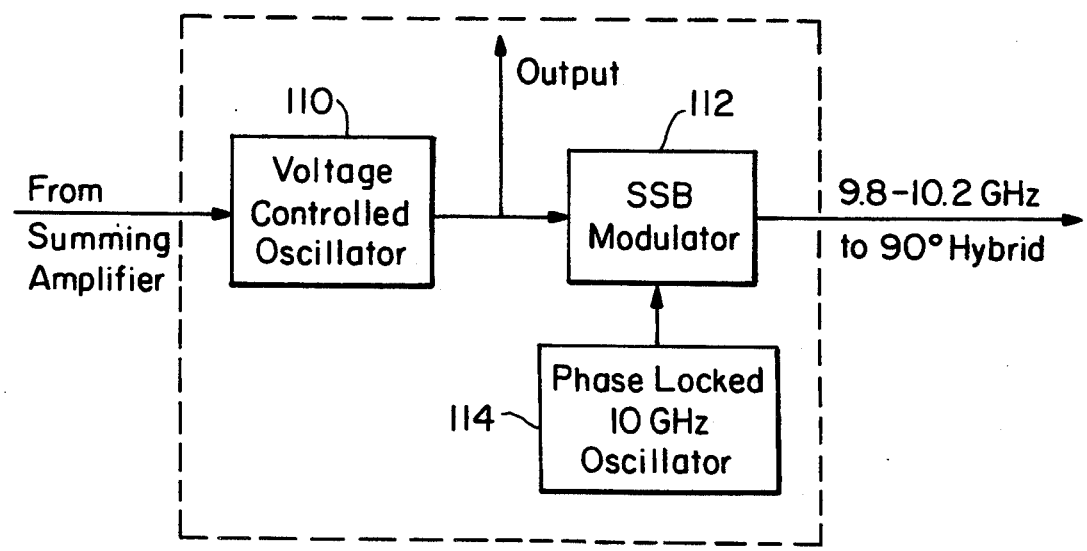
FIG. 9 is a more detailed block diagram of the voltage control synthesized microwave signal circuit of FIG. 7.

Voltage-controlled synthesized microwave signal circuit 50 may include a voltage-controlled oscillator 110, FIG. 9, which is used to effect a single side band modulation in modulator 112 of the 10 GHz signal delivered by phase locked oscillator 114.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A microwave resonator accelerometer comprising:
    a microwave resonant cavity having a predetermined resonant frequency; said cavity including a flexible portion;
    a proof mass fixed to said flexible portion for changing the geometry and establishing a new resonant frequency of said cavity in response to an acceleration force on said proof mass;
    means for coupling to said cavity a microwave frequency signal at or approximately at said predetermined resonant frequency; and
    means, responsive to a reflected microwave signal from the cavity, for discriminating a shift in said predetermined resonant frequency of said cavity to a new resonant frequency effected by a change in geometry of said cavity resulting from said acceleration force on said proof mass; said discriminating means includes a phase locked loop circuit; said circuit comprising an oscillator for generating a microwave carrier signal proximate said predetermined resonant frequency; means for modulating said microwave carrier signal with a modulating signal; means for submitting the modulated microwave carrier signal to said means for coupling and for receiving a reflected signal from said cavity; and means for determining an acceleration signal from the difference between the submitted modulated microwave carrier signal and said reflected signal.

2. The microwave resonator accelerometer of claim 1 in which said flexible portion is formed of ceramic material.

3. The microwave resonator accelerometer of claim 2 in which said cavity further includes a microwave reflector fixed to said proof mass and disposed inside of said flexible portion.

4. The microwave resonator accelerometer of claim 2 in which said cavity is formed of low or zero temperature coefficient of expansion material.

5. A microwave resonator accelerometer comprising:
    a microwave resonant cavity having a predetermined resonant frequency; said cavity including a flexible portion;
    a proof mass fixed to said flexible portion for changing the geometry and establishing a new resonant frequency of said cavity in response to an acceleration force on said proof mass;
    means for coupling to said cavity a microwave frequency signal at or approximately at said predetermined resonant frequency;
    means, responsive to a reflected microwave signal from the cavity, for discriminating a shift in said predetermined resonant frequency of said cavity to a new resonant frequency effected by a change in geometry of said cavity resulting from said acceleration force on said proof mass;
    means, responsive to said means for discriminating, for enabling said means for coupling to shift said predetermined resonant frequency of said microwave signal to said new resonant frequency; and
    means, responsive to said means for enabling, for detecting the difference between said predetermined resonant frequency and said new resonant frequency representative of the acceleration of said proof mass.

6. The microwave resonator accelerometer of claim 5 further including means, responsive to said accelerometer signal for adjusting the frequency of said microwave carrier signal to match the new resonant frequency.

7. The microwave resonator accelerometer of claim 6 further including a converter circuit for converting said modulated microwave carrier signal from the microwave range to a lower range for signal processing.

8. A microwave resonator accelerometer comprising:
    first and second complementary microwave resonant cavities, each said cavity having a predetermined resonant frequency; each said cavity including a flexible portion;
    proof mass means fixed to said flexible portion of each said cavity for differentially changing the geometry and establishing a new resonant frequency of each said cavity in response to an acceleration force on said proof mass means;
    means for coupling to each said cavity a microwave frequency signal at or approximately at said predetermined resonant frequency of each said cavity; and means, responsive to a reflected microwave signal from each said cavity, for discriminating a shift in said predetermined resonant frequency of each said cavity to a new resonant frequency effected by the change in geometry of each said cavity resulting from said acceleration force on said proof mass means.

9. The microwave resonator accelerometer of claim 8 in which each said flexible portion is formed of ceramic material.

10. The microwave resonator accelerometer of claim 8 in which each said cavity further includes a microwave reflector fixed to said proof mass and disposed inside of said flexible portion.

11. The microwave resonator accelerometer of claim 9 further including means, responsive to said means for discriminating, for enabling said means for coupling to shift said predetermined resonant frequency of each said reflected microwave signal to said new resonant frequency of each said cavity.

12. The microwave resonator accelerometer of claim 11 further including means, responsive to said means for enabling, for detecting for each said cavity the difference between the predetermined resonant frequency and the new resonant frequency representative of the acceleration of said proof mass means.

13. The microwave resonator accelerometer of claim 9 in which each said cavity is formed of low or zero coefficient of temperature material.

14. The microwave resonator accelerometer of claim 8 in which said means for discriminating includes a phase locked loop circuit associated with each said cavity.

15. The microwave resonator accelerometer of claim 14 in which each said phase locked loop circuit includes an oscillator for generating a microwave carrier signal proximate each said predetermined resonant frequency; means for modulating said microwave carrier signal with a modulating signal; means for submitting a modulated microwave carrier signal to said means for coupling and for receiving a reflected signal from each said cavity; and means for determining for each said cavity an acceleration signal from the difference between the submitted modulated microwave carrier signal and said reflected signal from each said cavity.

16. The microwave resonator accelerometer of claim 15 further including means, responsive to each said acceleration signal for adjusting the frequency of said microwave carrier signal to match each said new resonant frequency.

17. The microwave resonator accelerometer of claim 16 further including a converter circuit for converting said modulated microwave carrier signal from a microwave range to a lower range for signal processing.

18. The microwave resonator accelerometer of claim 8 in which said predetermined resonant frequencies are the same.

19. A microwave resonator accelerometer comprising:

first and second complementary microwave resonant cavities, each said cavity having a predetermined resonant frequency; each said cavity including a ceramic flexible portion;

proof mass means fixed to said flexible portion of each said cavity for differentially changing the geometry and establishing a new resonant frequency of each said cavity in response to an acceleration force on said proof mass means;

means for coupling to each said cavity a microwave frequency signal at or approximately at said predetermined resonant frequencies; and means, responsive to a reflected microwave signal from each said cavity, for discriminating a shift in the predetermined resonant frequency of each said cavity to a new resonant frequency effected by a change in geometry of each said cavity resulting from the acceleration force on said proof mass means.

* * * * *